United States Patent [19]

Brouwer et al.

[11] Patent Number: 4,564,105

[45] Date of Patent: Jan. 14, 1986

[54] TILTED SPIRAL ARTICLE DIVERTER

[75] Inventors: Gerald A. Brouwer, Grandville; Charles R. DeVries, Grand Rapids, both of Mich.

[73] Assignee: Lear Siegler, Inc., Grand Rapids, Mich.

[21] Appl. No.: 566,824

[22] Filed: Dec. 29, 1983

[51] Int. Cl.⁴ .................. B65G 47/53; B65G 47/74; B65G 47/82
[52] U.S. Cl. ................... 198/457; 198/372; 198/598
[58] Field of Search ............... 198/372, 457, 436, 598

[56] References Cited

U.S. PATENT DOCUMENTS 2,010,486  8/1935  Herrmann ..................... 198/457
2,109,148  2/1938  Gwinn ........................ 198/457 X

FOREIGN PATENT DOCUMENTS 0137469  12/1948  Australia ..................... 198/436

Primary Examiner—Joseph E. Valenza
Assistant Examiner—Lyle Kim
Attorney, Agent, or Firm—Price, Heneveld, Huizenga & Cooper

[57] ABSTRACT

A transfer for conveyors has a spiral shaped sweep which is rotated to cause it to engage selected articles on a conveyor and push them off laterally. The sweep is supported on and rotated by a shaft which is inclined to the vertical and toward the conveyor whereby the circular path traced by its outer end is in an inclined plane and as it moves to its retracted position it moves upwardly. As it moves across the conveyor it has a zone of maximum approach to the conveyor surface which moves across the conveyor surface and outwardly along the sweep as the sweep rotates to its maximum extended position.

19 Claims, 14 Drawing Figures

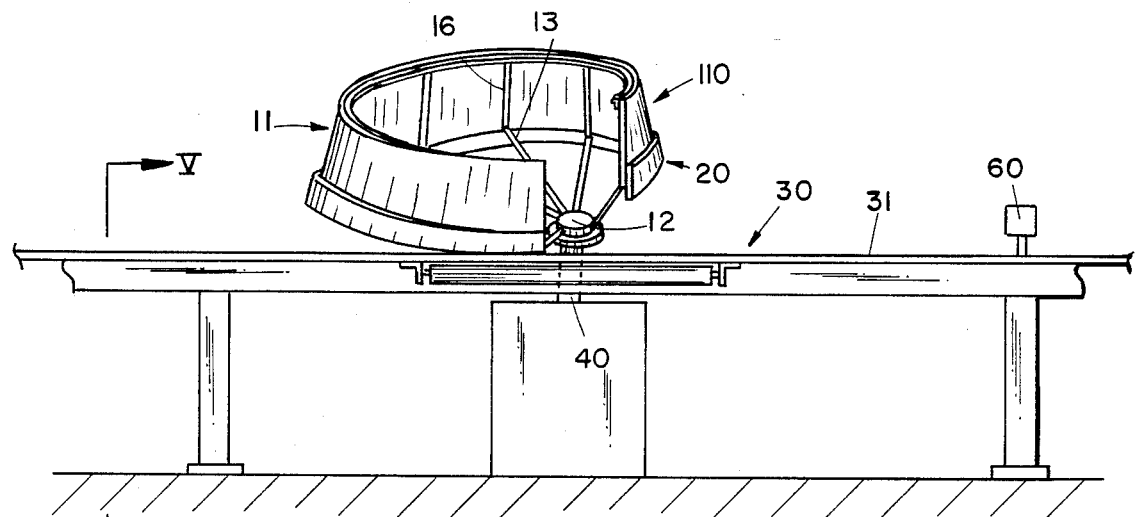
FIG 3
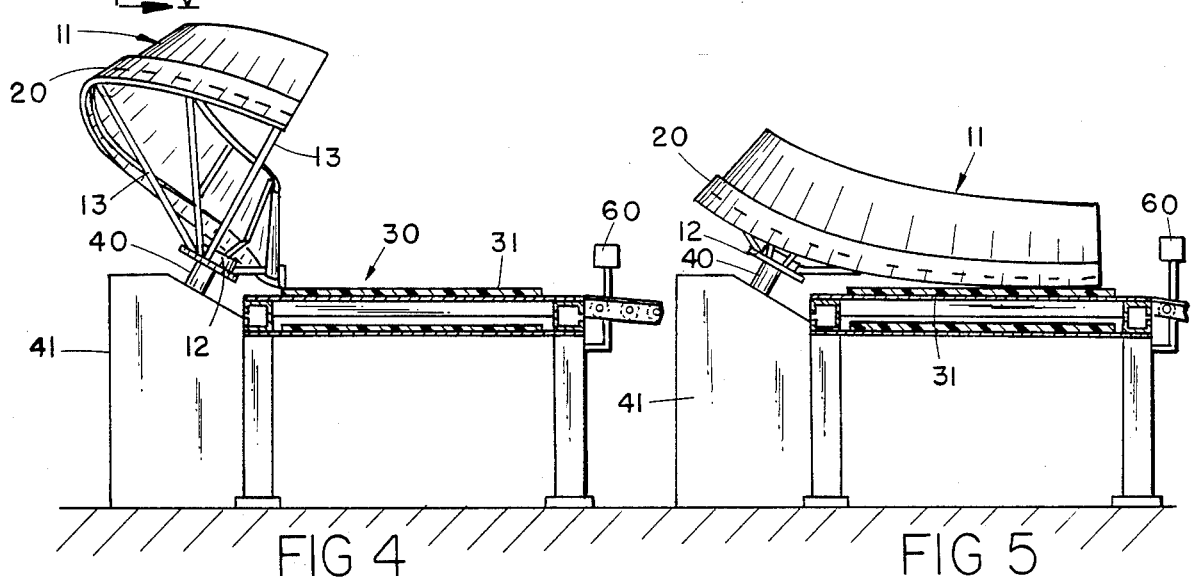
FIG 4
FIG 5
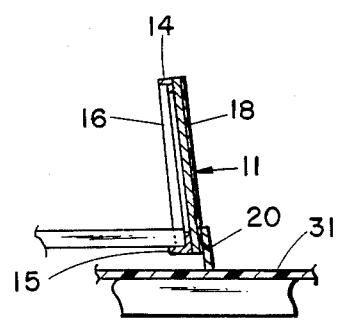
FIG 6
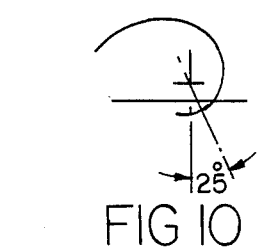
FIG 10
FIG 10A
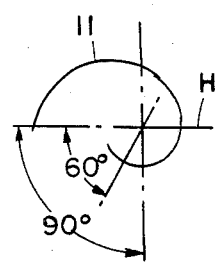
FIG 12
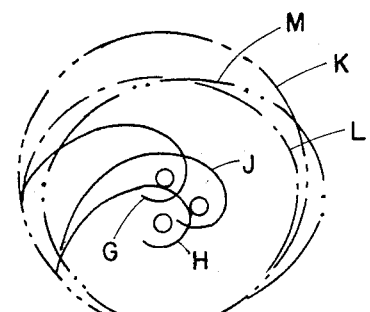
FIG 11

1

TILTED SPIRAL ARTICLE DIVERTER

FIELD OF THE INVENTION

The invention relates to transfer devices for conveyors and particularly to transfers capable of selecting articles for transfer from among a group of articles being transported in tandem on a main conveyor. The invention belongs particularly to that class of transfers capable of intermittent operation at high speeds and designed to substantially eliminate impact on the article being transferred.

BACKGROUND OF THE INVENTION

A particularly important aspect of the conveyor art is that of transfering articles from one conveyor to another or to some other facility. In cases in which every article is to be transferred, the problems involved are somewhat different and less complicated than those in which only selected articles are to be transferred. Particularly in the latter case, existing devices have been lacking in the desired elimination of article damaging impact if the transfer device is to operate at high speeds. This has been particularly true of the ram type of transfer which advances to push the article laterally off the conveyor and retracts before the next article reaches the ram. Such devices are completely unacceptable for use with articles which are fragile, subject to scratching or other physical damage from the impact of the ram. This is true particularly in the case of baggage transfers.

Another problem has been the fact that as the demand for more efficient use of conveyor systems has increased, the speed of operation of the conveyors has been significantly increased. The result of this is that the time interval during which the transfer device must complete an operating cycle has been significantly reduced, necessitating higher speeds with the attendant increase in impact force. Also, as the speed of operation has increased the problem of overcoming inertia and momentum of the transfer device has become more significant and more difficult to deal with. Another factor significantly affecting the design and construction of transfer devices is the increasing cost of the space occupied by the devices. Over a period of time such as a year, each square foot of floor space unnecessarily occupied by such devices becomes an expensive luxury which many industries, particularly the airlines, cannot afford. It is the object of this invention to provide a solution to these problems.

BRIEF DESCRIPTION OF THE INVENTION

The invention utilizes a rotary transfer mechanism equipped with a sweep or panel of generally spiral configuration. Thus, as the transfer device is rotated, the panel moves across the surface of the conveyor on which the articles to be transferred are travelling. In doing so it makes a sliding, preliminarily basically tangential contact with the article. The spiral shape then rapidly accelerates the lateral or sideways movement of the article to push it off the conveyor. Further, the axis about which the transfer panel is rotated is inclined to the longitudinal centerline of the main conveyor. The spiral is so shaped that while it sweeps across the surface of the conveyor a portion of it is close to or in contact with the surface of the conveyor. This portion of the panel makes contact with and moves across the conveyor surface pushing the article with it. As the panel moves to retracted position, its free end moves largely upwardly rather than entirely laterally. In this way the total floor area occupied by the equipment is reduced without sacrifice of the operating principles of the invention.

BRIEF DESCRIPTION OF THE DRAWINGS

FIG. 3 is a view taken in the same direction as FIG. 2, illustrating the transfer panel as it completes the removal of an article from the main conveyor;

FIG. 4 is a sectional elevation view taken along the plane IV—IV of FIG. 1, illustrating the transfer panel in the retracted position of FIG. 1;

FIG. 5 is a sectional view taken along the plane V—V of FIG. 3 illustrating the transfer panel in the position shown in FIG. 3;

FIG. 6 is an enlarged, fragmentary sectional view of the transfer panel and of the flexible apron secured to its outer face;

FIG. 10 is a schematic view of the transfer illustrating the location of the panel's area of closest approach to the conveyor surface for the invention incorporating the construction of FIG. 1;

FIG. 10A is a schematic view similar to FIG. 11 but applied to the invention incorporating the construction of FIG. 7;

FIG. 11 is a diagrammatic view illustrating the result of tipping the axis of the transfer panel;

FIG. 12 is a diagrammatic illustration of the development of an examplary spiral sweep.

DESCRIPTION OF THE PREFERRED EMBODIMENT

Figure 1:
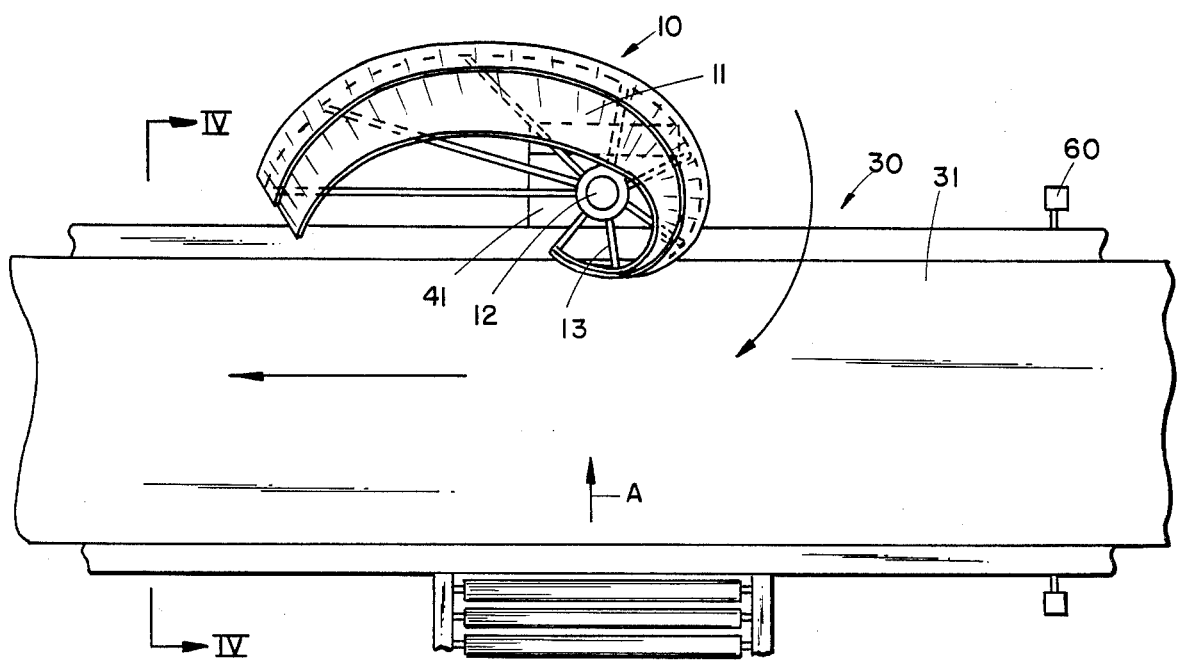
FIG. 1 is a plan view showing the transfer of this invention mounted beside a conveyor with the transfer panel in retracted position.
Figure 2:
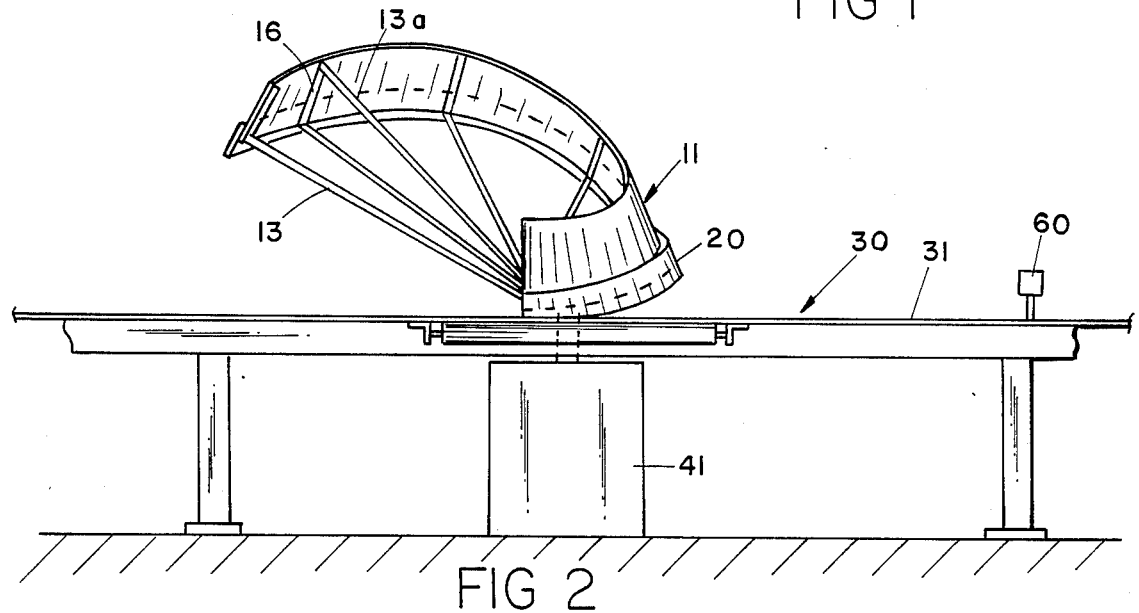
FIG. 2 is a view taken in the direction of the arrow A of FIG. 1 again showing the invention in retracted position.
Figure 13:
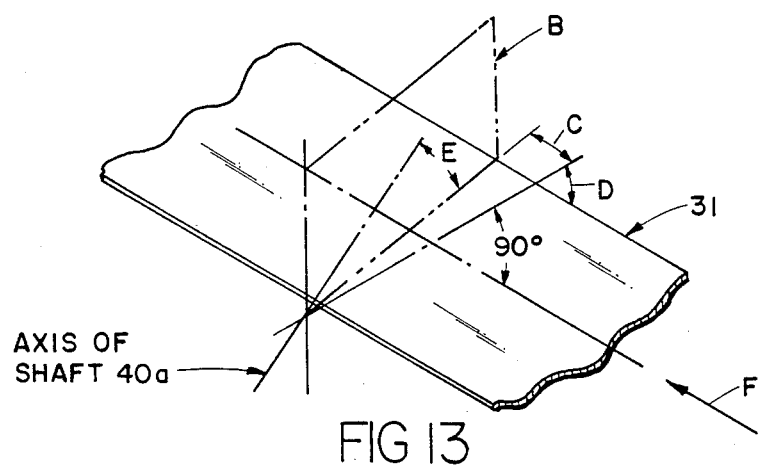
FIG. 13 is a diagram of the angular position of the shaft for the sweep in a modified construction.
Figure 7:
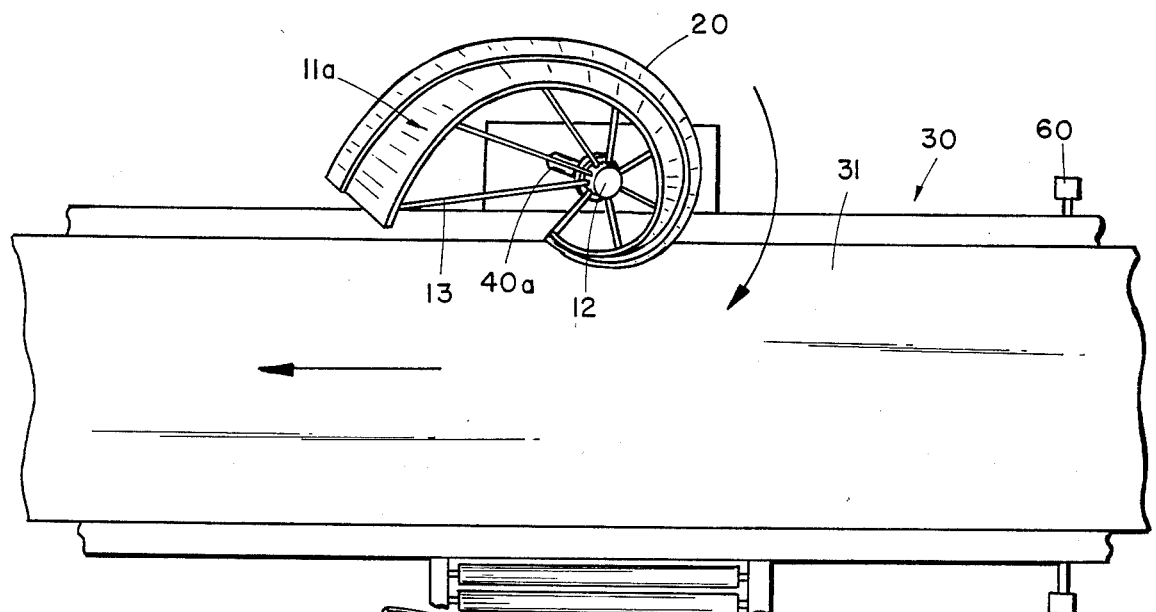
FIG. 7 is a plan view of a modified construction for the invention in which the shaft mounting the transfer panel is inclined both toward the main conveyor and upstream of the main conveyor.
Figure 8:
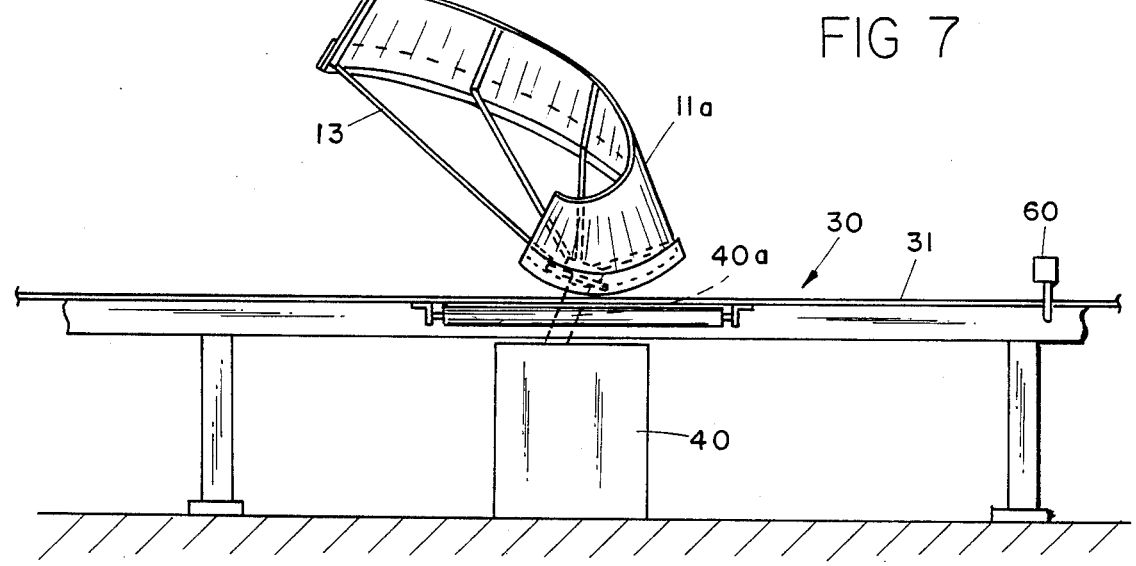
FIG. 8 is a view similar to FIG. 2 but illustrating the transfer panel of FIG. 7.
Figure 9:
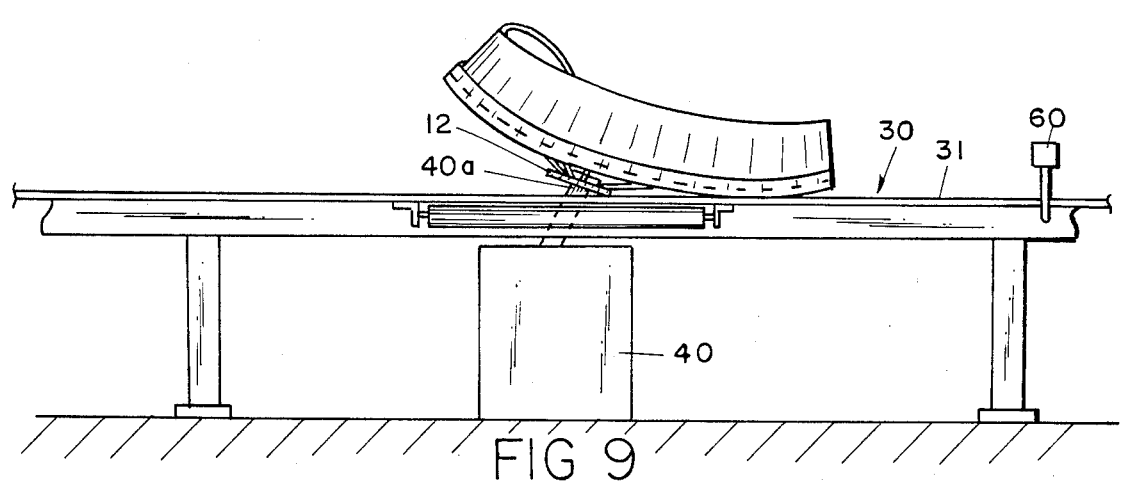
FIG. 9 is a view similar to FIG. 3 but illustrating the transfer panel of FIG. 7.

Referring to FIG. 1, the numeral 10 indicates a transfer having a sweep or transfer panel 11 supported on a hub 12 by means of radially extending spokes 13. The panel preferably has top and bottom reinforcement members 14 and 15 (FIG. 6) which could be an inwardly turned edge flange or a separate L-shaped angle member to which the panel 11 is welded or riveted. The outward ends of the spokes 13 are secured to one of the reinforcement members 14 or 15, preferably the lower member 15 since this one has to sustain the major portion of the loads resulting from sweeping an article off the conveyor. The spokes can be attached in any of several ways but preferably it is by welding. Also, preferably at the ends of each of the spokes a vertical rib 16 is provided to transfer loads between the reinforcement members. Also, where necessary, additional reinforcement may be provided such as by adding more spokes such as the inclined upper spoke 13a (FIG. 2).

Preferably the panel is fabricated from a relatively thin sheet of steel or a somewhat thicker sheet of aluminum rolled to the desired spiral shape. The reinforcement members 14, 15 and 16 are also preferably of aluminum or relatively thin steel. The importance of this is to provide the panel with adequate rigidity to make it serviceable and durable with a minimum of weight. Minimum weight is very important in reducing momentum and inertia, factors which produce serious problems in the operation of this type of high speed transfer device. It is for this purpose that the number of spokes are kept to a minimum.

It is possible that the panel itself may be made of a thin, light weight plastic such as an ultra high molecular weight polyethlene which would have substantial resistance to puncture and shock without requiring material thicknesses involving substantial mass or weight. To further facilitate the movement of articles the exterior surface of the panel may be formed by a thin sheet of a plastic material such as a plastic material which has the desired relatively low coefficient of friction and high resistance to wear.

Preferably, secured to the lower edge of the outer surface of the panel is an apron 20. The apron is of a wear resistant, flexible material such as conveyor belting. It provides the portion of the sweep which can and preferably does contact the surface of the main conveyor 30 with means to prevent articles from wholly or partially working their way under and beneath the panel where damage will be done to the article due to the opposing forces of the conveyor driving the article lengthwise and the lateral, sweeping movement of the sweep as it pushes the article sideways across the conveyor surface. The apron 20 should be wear resistant and it should be of a material which will not cause damage, abrasion or wear to the surface of the conveyor 30. Particularly is this true if the conveyor is of the type having a belt 31 forming the conveying surface as illustrated in FIGS. 1-9. However, it will be recognized that the invention can be used with various other types of conveyors such, for example, as powered roller or crescent conveyors.

It is preferable that the front or outer face of the panel be slightly inclined toward the hub 12 in an upward direction whereby the bottom edge of the sweep is the edge making initial contact with and absorbing most of the force necessary to push an article off the conveyor. This arrangement imposes these loads primarily against the reinforcement member 15 at the bottom of the panel. Also, as shown in FIGS. 1-6, this is the portion of the panel primarily supported by the spokes 13. This makes it possible to use a much simplified structure at the upper portion of the panel reducing the total weight and mass of the panel.

As will be best seen in FIGS. 3, 4 and 5, the hub 12 is supported on a shaft 40. The shaft itself is mounted to and driven by a suitable drive mechanism 41, the details of which are not illustrated since they are conventional. Basically, the drive mechanism consists of a prime mover, a suitable speed reducing mechanism and known means to cause the shaft to stop at and start from the position at the end of each 360° cycle of rotation. In the form of the invention illustrated in FIGS. 1-5, the axis of the shaft is located in a plane which is normal to the longitudinal centerline of the main conveyor but inclined laterally of the main conveyor between 15° and 45°, preferably approximately 30°. At a shaft inclination of 45° the position of that portion of the panel opposite from the main conveyor with respect to the hub will be positioned over the hub. Further inclination of the shaft will be counter productive. The hub of the sweep is positioned close to the edge of the conveyor and above the conveyor surface.

It is important that the sweep in retracted position be entirely withdrawn from the article transport surface of the conveyor so it will not interfere with the movement of articles not selected for discharge. The panel 11 is shaped such that as the shaft rotates the panel sweeps across the conveyor. As it does so a portion of the bottom edge of the panel is close to or actually contacts the conveyor's surface.

This portion or zone moves laterally across the conveyor as the sweep rotates. At the same time it migrates along the sweep from near the inner end to a point at or adjacent the free or outer end. This zone initially is at the inner most or initial portion of the spiral as the sweep's cycle of rotation starts, as illustrated in FIGS. 2 and 4. As the sweep rotates, this zone of contact with the conveyor moves across the surface of the conveyor and provides the zone where the sweep engages the article being transferred from the main conveyor. When the sweep has made approximately a 270° arc of rotation, this zone of contact will be adjacent the free end of the spiral panel and will be at the opposite edge of the conveyor and will have caused the article's discharge from the conveyor.

In many applications, such as when the articles are on pallets or are in cartons, the lower edge of the sweep can be spaced above the surface of the conveyor because there is no risk of the article or a portion of the article becoming wedged between the sweep and the conveyor. However, when the articles are of a different character such as soft luggage, such as flexible leather or plastic bags or fabric clothing carryalls, this is a common and serious occurrence with resultant damage to the luggage. For this type of article it is necessary that the bottom edge of the sweep contact and wipe across the conveyor surface to prevent any portion of the article working its way between the sweep and the conveyor surface. Particularly is this true with belt conveyors in which the belt has a tendency to pull the article under the sweep.

By inclining the axis of the shaft 40 only a small portion or zone of the overall length of the spiral of the sweep actually contacts and wipes the main conveyor surface. This reduces the amount of drag resulting from the wiping movement. This force can be substantial in the case of the apron wiping across the surface of a conveyor belt. Also the wear incident to such action is reduced. The size and power consumption of the prime mover necessary to drive the sweep is reduced.

After the sweep has removed the article, it continues to rotate until it reaches its retracted position illustrated in FIG. 1. At this point, by means of a suitable mechanism such as a brake, the sweep is stopped and remains stationary until a new cycle is initiated. Such mechanisms are conventional and, therefore, are not a part of this invention and are neither illustrated nor described in detail.

The cycling of the sweep can be controlled in a number of ways. For example, each article could have a code applied to it which is read as the article passes a reader 60 upstream of the sweep. If the reader finds a code to which the reader is supposed to response, it transmits this information to the sweep's drive 41 and, based upon a combination of the size of the article, the speed of the main conveyor and the speed at which the sweep 10 is set to rotate, the sweep will pass through a cycle which consists of a single 360° revolution. This cycle will be timed such that when the article reaches the sweep the sweep will have initiated its rotation and will present the zone of contact to the article. Because this will occur when the radius of the spiral is small, the zone of contact will be presented substantially tangentially to the article. The result is a tangential or sliding initial contact with the article. Thereafter the spiral shape of the sweep will rapidly accelerate the article laterally without the shock of impact and push it off the conveyor. Because the article contacting surface of the sweep will be moving significantly in the same direction as the article at the point of initial contact making their respective movements largely complimentary, the initial contact between the sweep and the article will be largely if not entirely without the shock of sudden impact. There will be no sudden and significant change in direction. This type of initial tangential contact followed by rapid but progressive acceleration eliminates the article damage incident to a sudden change in either direction or velocity.

The inclined shaft also causes the outer or free end of the sweep 11 to move upwardly as it moves to its parked or retracted position. This is different than the movement which occurs when the sweep is rotated about a vertical axis. The upward movement of the sweep reduces the lateral space or floor area needed for the transfer and thereby saves valuable and expensive space in any facility utilizing a conveyor device of this type. This is important where space is restricted and expensive.

At the same time as the sweep initiates its cycle or rotation, the free or outer end of the sweep which is furthest removed from the shaft and thus creates the greatest momentum moves downwardly and, thus, works with the rotation mechanism by reason of the force of gravity. This reduces the amount of energy necessary to drive the sweep. At the opposite end of the cycle when the sweep is being retracted after completing the transfer of the article, the weight of the extended end being lifted upwardly absorbs some of the momentum of the sweep. This reduces the amount of braking force necessary to bring the sweep to a stationary condition in its retracted position.

A further benefit of the inclination of the shaft 40 is reduction in the length of the spokes. This reduces weight and the moment arm of the panel, both contributing to reduction of the inertia of the transfer. Thus, there is a double benefit to the inclined position of the sweep. It is a significant contribution to overcoming the forces incident to rapid starting and stopping of the sweep permitting higher operating speeds. It is possible to operate the sweep in the range of 80 to 100 cycles per minute. Thus, it can cooperate with a conveyor on which the articles are being moved at even higher speeds than the 320 feet per minute set out in the example. This materially increases the capacity of the transfer and, of course, of the conveyor with which it cooperates.

It will be recognized that the particular shape of the spiral sweep can be varied. The type of articles and the speed of operation are among factors which can influence the design of the spiral. However, for a sweep to discharge luggage of random shape, size and construction from a belt conveyor having a belt width of 30 inches, operating at 320 feet per minute and the sweep designed to operate at 90 rpm and to be capable of 80 cycles per minute, the following developed shape has been found to produce excellent results:

| Location of Radius | Length of Radius in Inches |
| --- | --- |
| 60° | 4.961 |
| 90° | 5.997 |
| 105° | 6.593 |
| 120° | 7.247 |
| 135° | 7.968 |
| 150° | 8.760 |
| 165° | 9.632 |
| 180° | 10.590 |
| 195° | 11.639 |
| 210° | 12.798 |
| 225° | 14.071 |
| 240° | 15.465 |
| 255° | 17.004 |
| 270° | 18.695 |
| 285° | 20.555 |
| 300° | 22.600 |
| 315° | 24.849 |
| 330° | 27.311 |
| 345° | 30.039 |
| 360° | 33.015 |

The locations of the radii are expressed as arcuate displacement from a line H parallel to the centerline of the main conveyor and passing through the center of the hub 12 as shown in FIG. 12.

FIGS. 7, 8, 9, 10A and 13 illustrate a modified construction for the invention in which the axis of the shaft 40a is inclined both laterally and upstream of the conveyor. In this case the axis of the shaft is positioned in a plane B (FIG. 13) inclined horizontally in the upstream direction 20° to 30° (angle C) from a line D which is perpendicular to the centerline of the conveyor. The shaft is also inclined vertically 45° to 75° (angle E) from the surface of the conveyor 31. This combination of angles produces an apparent angle of approximately 44.5° to 75° when the shaft is viewed from the direction of arrow F. In the preferred construction, angle C is approximately 26° and angle E is approximately 68°, producing an apparent angle of approximately 70° (as seen from F). The most functionally effective combination of the angles C and E are those which produce an apparent angle in the range of 60° to 70°. This results in the low point, that is, the zone of the closest approach of the sweep 11a to the conveyor surface shifting from a point approximately 25° upstream of the hub of the sweep (FIG. 10) to a position approximately 45° upstream from the hub (FIG. 10a). Thus, there is somewhat more lateral action on the article during the remaining rotation of the sweep than there is with the construction in which the axis is inclined only laterally of the conveyor. This does have the desired result of presenting the face of the sweep 11a more to the side of the article rather than in front of it, reducing the tendency of the sweep to move over or trap any portion of the article between the sweep and the conveyor surface. Further, because of its action, it is able to handle relatively soft articles on the conveyor. Such articles have a tendency to become pinched between the sweep and the conveyor surface. This is particularly true of such articles as soft luggage and carryall clothing bags. These are examples of particularly difficult articles to handle in transferring from one conveyor to another. Also, because of the high operating speed of the transfer, it is possible to select articles moving in fairly close pack relationship with a high degree of accuracy and without interference between the sweep and the next approaching article. The conservation of floor space is graphically illustrated in FIG. 11 in which the letter G indicates the sweep arm when the axis of rotation is vertical. The letter H indicates the sweep arm when the axis of rotation is inclined approximately 30° normal to the centerline of the conveyor and the letter J indicates the sweep arm when the axis is inclined at a compound angle both laterally and upstream of the conveyor. In the case of the sweep arm G, the path traced by the free end is indicated by the dash line K and, in the case of the sweep arm H, the path traced by the free end is indicated by the double broken line L. In the case of the sweep arm mounted on the dually inclined axis, the path of travel is indicated by the broken line M. It will be noted that the maximum outward sweep of the free end of the sweep arm is materially reduced by both the single and compound inclinations of the axis.

Testing the sweeps incorporating this invention indicate that significant functional improvement can be obtained when the apparent angle of inclination of the axis of sweep rotation to the conveyor surface is between 20° and 45° irrespective of whether this angle represents a single inclination in a vertical plane normal to the conveyor centerline or a compound inclination in which the apparent inclination is the result of the combined angles.

Having described a preferred embodiment of the invention and a modification thereof, it will be recognized that various additional modifications may be made without departing from the principle of the invention. Such modifications are to be considered as included in the hereinafter appended claims unless these claims, by their language, expressly state otherwise.

We claim:

1. An article transfer for moving an article laterally from a conveyor to a laterally positioned receiving means, said transfer having an article engaging sweep of spiral configuration, a shaft and means supporting said shaft for rotation, said shaft being located adjacent one edge of said conveyor and inclined laterally of the conveyor whereby its upper end extends at an angle at which the shaft's extended axis would project over said conveyor, said sweep being secured to said shaft for rotation therewith, said attachment being adjacent the point of generation of said spiral sweep whereby at a first position in its rotation substantially all of said sweep is laterally displaced from said conveyor and at a second position in its rotation a portion of said sweep extends laterally substantially across said conveyor, the lower edge of said sweep tracing a curve which maintains a zone characterized by a substantially constant distance between said lower edge and the surface of the conveyor as the sweep is rotated by the shaft between said first and second positions in its rotation, said zone moving outwardly along said sweep and transversely of said conveyor as said sweep rotates.

2. The article transfer described in claim 1 wherein the progress of said zone along the sweep is from adjacent the shaft toward the outer end of the sweep as the sweep is rotated with the zone being spaced from the outer end when the outer end is at the side of the conveyor substantially opposite from the shaft.

3. The article transfer described in claim 1 wherein the axis of said shaft is in a plane normal to the centerline of the conveyor and inclined at an angle between 15° and 45° from the vertical toward said centerline.

4. The article transfer described in claim 1 wherein the axis of said shaft is in a plane normal to the centerline of the conveyor and inclined at an angle between 15° and 30° from the vertical toward said centerline.

5. The article transfer described in claim 4 wherein said zone initially is displaced upstream of the conveyor along a line extending from the center of rotation of the sweep at an angle of approximately 25° to a plane normal to the axis of the conveyor.

6. The article transfer described in claim 1 wherein the axis of said shaft is in a plane normal to the centerline of the conveyor and inclined at an angle of approximately 30° from the vertical toward said centerline.

7. The article transfer as described in claim 1 wherein the axis of the shaft is in a vertical plane inclined upstream of the conveyor at an angle to the centerline of the conveyor, said axis being inclined to the surface of the conveyor at an angle between 45° and 75°.

8. The article transfer as described in claim 7 wherein the horizontal angle of inclination to a line perpendicular to the conveyor centerline is between 20° and 30°.

9. The article transfer described in claim 1 wherein the axis of the shaft is in a vertical plane which is inclined horizontally upstream of the conveyor at an angle of approximately 26° from a line perpendicular to the centerline of the conveyor and is inclined vertically in said plane approximately 68° from the surface of the conveyor.

10. An article transfer as described in claim 1 wherein a skirt of flexible material is secured to said sweep and depends therefrom to contact the surface of the conveyor at said zone.

11. An article transfer as described in claim 10 wherein the outer face of said sweep is smooth and is characterized by a low co-efficient of friction.

12. An article transfer as described in claim 1 wherein the outer face of said sweep is inclined toward the axis of the sweep in an upward direction.

13. An article transfer as described in claim 1 wherein said conveyor has means for propelling articles along it, a sensor upstream of said shaft for detecting the approach of an article and drive means for intermittently rotating said shaft through a 360° cycle; control means connected to both said drive means and said sensor for timing the initiation of an operating cycle of said shaft in response to the combination of the spacing of the sensor from the shaft, the speed of movement of the article and the preset angular velocity of the shaft whereby the sweep will make initial contact with the article at a location between the center and trailing end of said zone of contact as the zone is passing the article.

14. An article transfer as described in claim 1 wherein said conveyor has means for propelling articles along it at a predetermined speed, a sensor upstream of said shaft for detecting the approach of an article and drive means for intermittently rotating said shaft through a 360° cycle; control means connected to both said drive means and said sensor for timing the initiation of an operating cycle of said shaft to effect contact between said sweep and the article at a point on the sweep in which during the remainder of the cycle the relationship between the bottom edge of the sweep and the conveyor surface is one of increasing separation.

15. An article transfer for moving an article laterally from a conveyor to a laterally positioned receiving means, said transfer having an article engaging sweep arm of spiral configuration, a shaft and means supporting said shaft for rotation, drive means for intermittently rotating said shaft through a 360° cycle; said shaft being located adjacent one edge of said conveyor and inclined laterally of the conveyor whereby its upper end extends at an angle at which the shaft's extended axis would project over said conveyor, said sweep arm adjacent the point of generation of its spiral shape being secured to said shaft for rotation therewith whereby at a first retracted position in its rotation said sweep arm is laterally substantially displaced from said conveyor and at a second advanced position in its rotation a portion of said sweep arm extends laterally substantially across said conveyor, the lower edge of said sweep arm tracing a curve which maintains a zone characterized by a substantially constant distance between said lower edge and the surface of the conveyor as the sweep arm is rotated, said zone traveling along the sweep arm as the sweep arm is rotated by the shaft between said first and second positions; a sensor on said conveyor upstream of said shaft for detecting the approach of an article; control means connected to both said drive means and said sensor for timing the initiation of an operating cycle of said shaft whereby the sweep arm will make initial contact with the article in said zone.

16. An article transfer as described in claim 15 wherein a skirt of flexible material is secured to said panel and depends therefrom to contact the surface of the conveyor in said zone.

17. An article transfer as described in claim 16 wherein said shaft is inclined toward the conveyor and at an angle of approximately 20° to 30° to the vertical.

18. An article transfer as described in claim 17 wherein said shaft has a hub at its upper end mounting the sweep arm, the axis of said shaft is in a vertical plane which is rotated in a horizontal plane upstream of the conveyor about said hub.

19. An article transfer as described in claim 16 wherein a plurality of radially extending spokes are secured to both said shaft and said spiral arm and support said sweep arm on said shaft, said spokes in their position closest to said conveyor as the sweep arm is rotated being parallel to the surface of said conveyor.

* * * * *